US011383290B2

(12) United States Patent
Janiszewski

(10) Patent No.: US 11,383,290 B2
(45) Date of Patent: Jul. 12, 2022

(54) METHOD OF OPERATING A MANUAL PRESS WITH A SAFETY POWER ASSIST

(71) Applicant: BTM Company LLC, Marysville, MI (US)

(72) Inventor: Joseph Andrew Janiszewski, Port Huron, MI (US)

(73) Assignee: BTM Company LLC, Marysville, MI (US)

( * ) Notice: Subject to any disclaimer, the term of this patent is extended or adjusted under 35 U.S.C. 154(b) by 217 days.

(21) Appl. No.: 16/584,140

(22) Filed: Sep. 26, 2019

(65) Prior Publication Data

US 2020/0016648 A1 Jan. 16, 2020

Related U.S. Application Data

(62) Division of application No. 15/178,618, filed on Jun. 10, 2016, now Pat. No. 10,456,824.

(51) Int. Cl.
*B21D 55/00* (2006.01)
*B30B 1/32* (2006.01)
*B21J 15/28* (2006.01)
*B30B 15/28* (2006.01)
*F16P 3/00* (2006.01)
*B21D 39/03* (2006.01)

(52) U.S. Cl.
CPC .............. *B21D 55/00* (2013.01); *B21J 15/28* (2013.01); *B30B 1/326* (2013.01); *B30B 15/285* (2013.01); *F16P 3/001* (2013.01); *B21D 39/03* (2013.01)

(58) Field of Classification Search
CPC .......... B21D 39/03; B21D 55/00; B21J 15/28; B30B 1/24; B30B 1/326; B30B 15/285; B30B 1/04; B30B 1/20; F16P 3/001
See application file for complete search history.

(56) References Cited

U.S. PATENT DOCUMENTS 2,199,501 A 5/1940 MacBlane
2,222,851 A 11/1940 MacBlane
2,400,486 A 5/1946 Carlyle
(Continued)

FOREIGN PATENT DOCUMENTS

BE 1016759 A3 6/2007
DE 4236057 A1 4/1994
(Continued)

OTHER PUBLICATIONS

"Universal Hydraulic Presses for Production & Prototype Applications," www.btmcorp.com, 2004, 4 pages.
(Continued)

*Primary Examiner* — Jessica Cahill
*Assistant Examiner* — Jared O Brown
(74) *Attorney, Agent, or Firm* — Harness, Dickey & Pierce, P.L.C.

(57) ABSTRACT

A safety power assist for a manual press is provided. In another aspect, a press includes a tool, a manual actuator, a switch and an automatically powered actuator. A further aspect of the present press employs a spring which must be compressed beyond a predetermined pinching force before a switch is activated, where switch activation causes an automatically powered actuator to advance a workpiece-contacting punch or tool.

29 Claims, 16 Drawing Sheets

(56) References Cited

U.S. PATENT DOCUMENTS

| | | | |
|---|---|---|---|
| 3,686,922 A * | 8/1972 | Bley | B30B 1/32 |
| | | | 72/441 |
| 4,105,899 A | 8/1978 | Velosa | |
| 4,457,418 A | 7/1984 | Johnston | |
| 5,381,661 A | 1/1995 | Malina | |
| 5,937,694 A | 8/1999 | Mueller | |
| 6,114,690 A | 9/2000 | Oei et al. | |
| 6,737,765 B2 | 5/2004 | Gharst | |
| 6,779,343 B2 | 8/2004 | Sawdon | |
| 7,108,459 B1 | 9/2006 | Mueller | |
| 7,114,436 B1 | 10/2006 | Mueller | |
| 7,263,831 B2 | 9/2007 | Sawdon et al. | |
| 7,267,512 B1 | 9/2007 | Mueller | |
| 7,685,925 B2 | 3/2010 | Sawdon et al. | |
| 7,694,399 B2 * | 4/2010 | Sawdon | B21D 39/031 |
| | | | 29/243.53 |
| 2001/0032553 A1 | 10/2001 | Finkler | |
| 2008/0295709 A1 | 12/2008 | Rapp | |
| 2012/0137496 A1 | 6/2012 | Sawdon et al. | |
| 2012/0167366 A1 * | 7/2012 | Mauer | B21J 15/025 |
| | | | 29/407.08 |
| 2014/0251166 A1 | 9/2014 | Babiel | |

FOREIGN PATENT DOCUMENTS

| | | | |
|---|---|---|---|
| DE | 4322318 A1 | 1/1995 | |
| DE | 102004007265 A1 | 9/2005 | |
| DE | 102005025756 A1 | 1/2006 | |
| EP | 0449664 A2 * | 10/1991 | B30B 1/32 |
| EP | 1854566 A1 | 11/2007 | |
| GB | 2028951 A | 3/1980 | |
| JP | 2004337897 | 12/2004 | |
| WO | WO-9314926 A1 * | 8/1993 | B30B 1/00 |

OTHER PUBLICATIONS

"Gechter.com—presses publication," Oct. 14, 2015, 16 pages.
"Tox—Pressotechnik—Prasy kolanowe z pneumatycznym skokiem roboczym," published or offered for sale prior to May 20, 2016, with English translation description thereof, 1 page.
"Hydraulic press safety is vital in automotive manufacturing," www.fluidpowerworld.com, May 19, 2016, 2 pages.
"Technical Advisory for Safe Use of Power Presses and Press Brakes," www.wshc.gov.sg, Jun. 2009, 30 pages.
"Bedienungsanleitung Für Gechter—Presse, TYP—HKP/L 13/ 20 kN," www.Gechter.com, 2007, 12 pages.

* cited by examiner

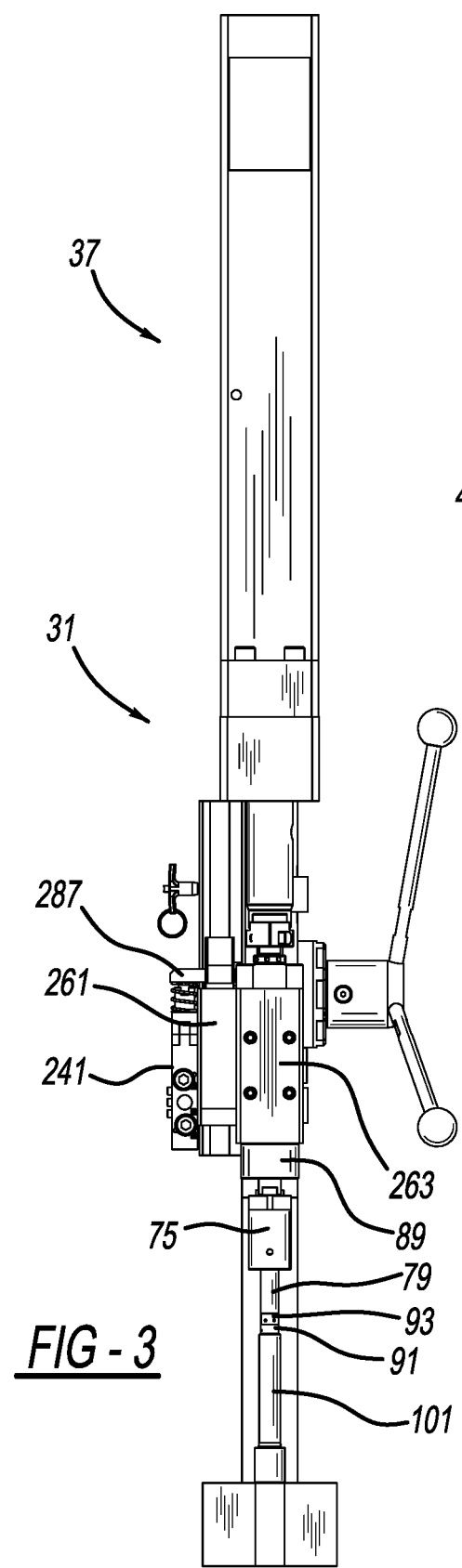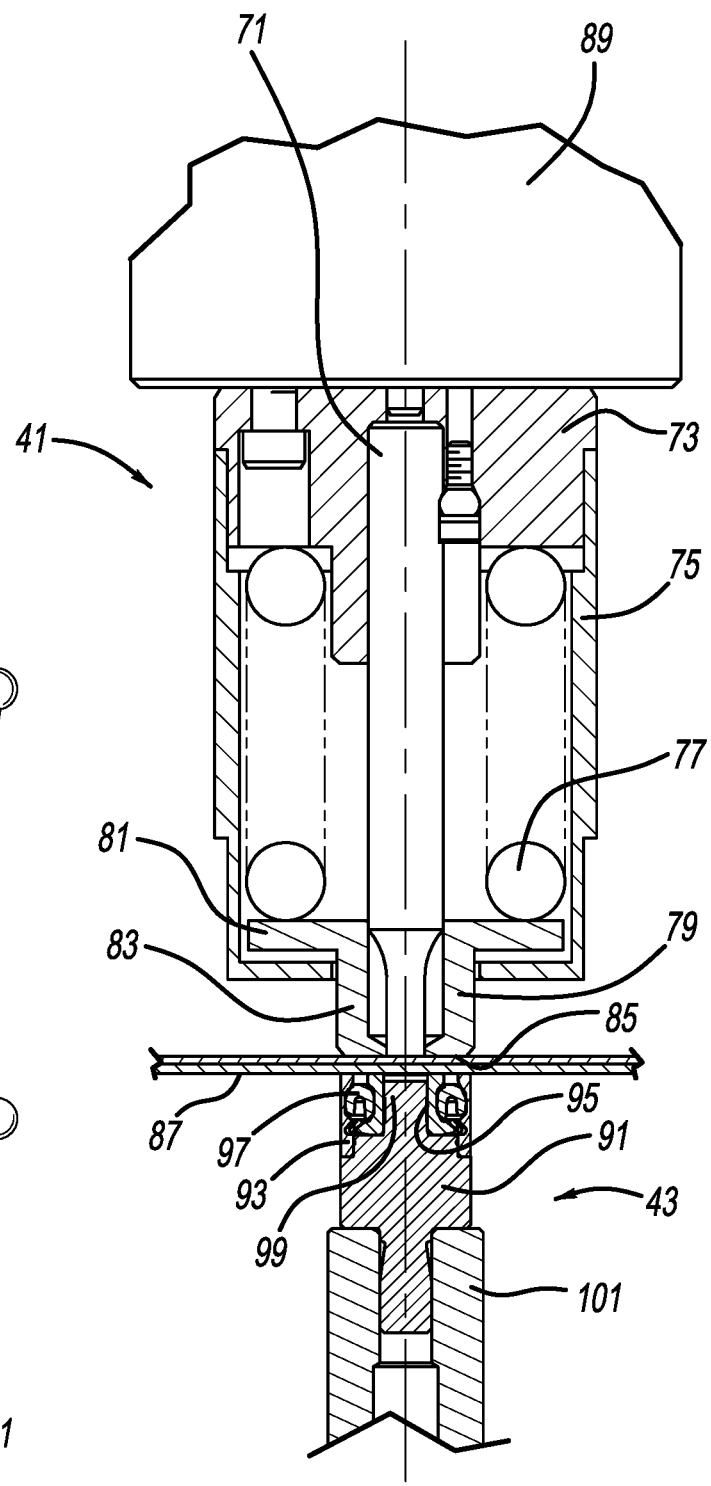

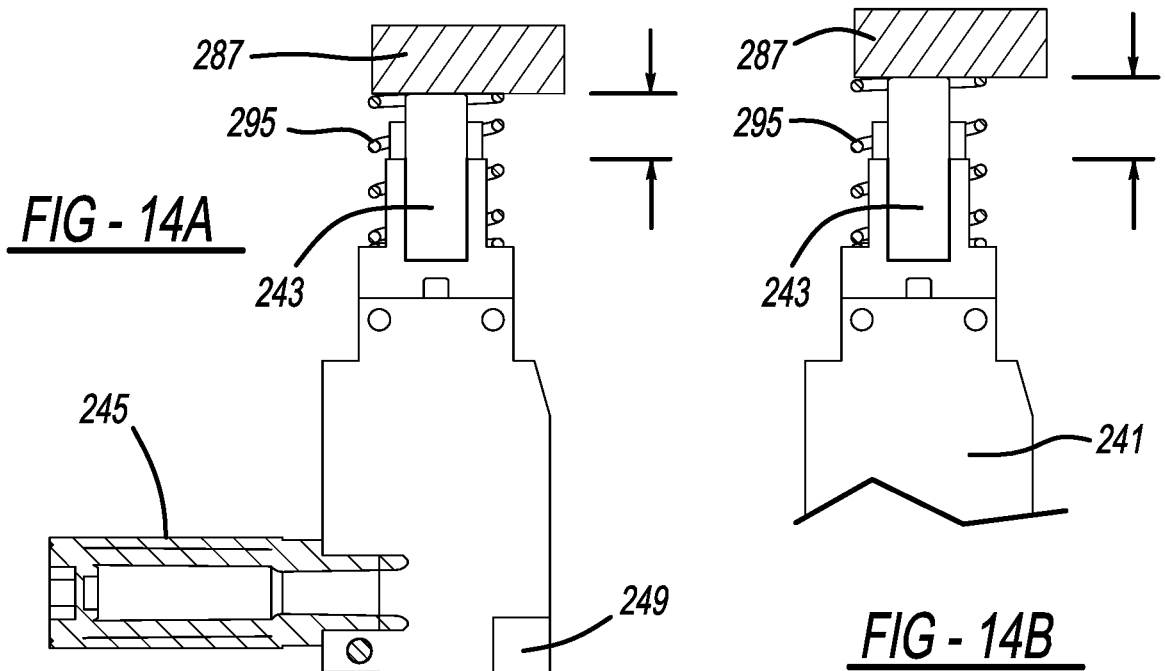
FIG - 14A
FIG - 14B
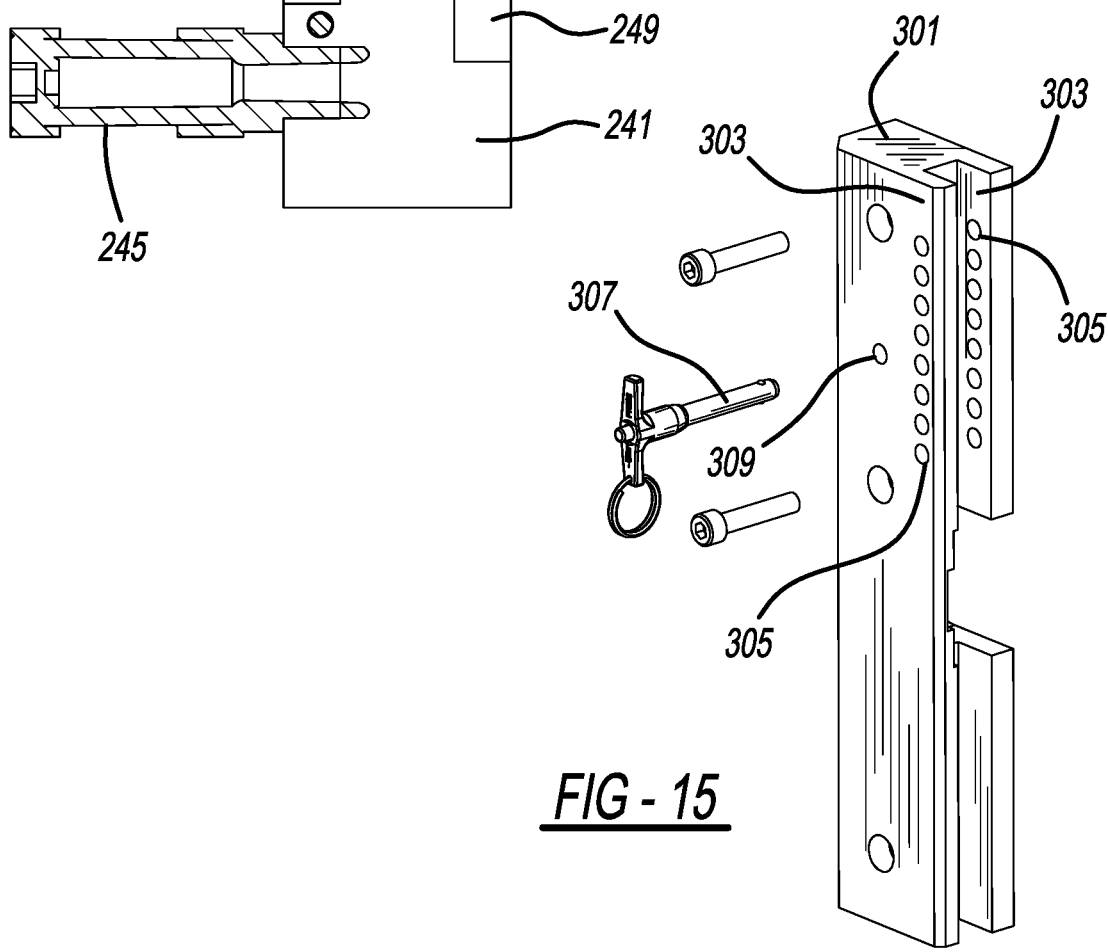
FIG - 15

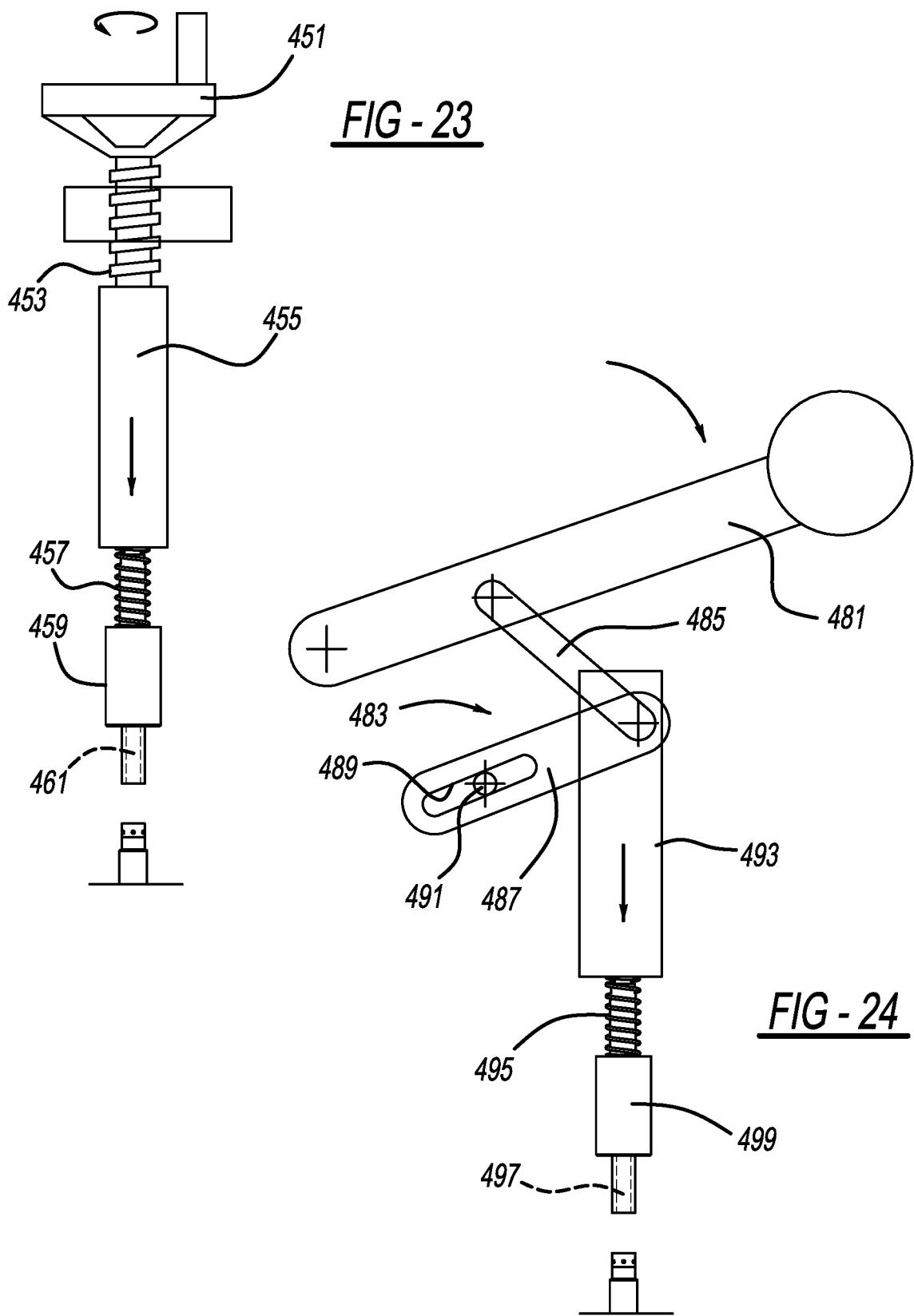

METHOD OF OPERATING A MANUAL PRESS WITH A SAFETY POWER ASSIST

CROSS-REFERENCE TO RELATED APPLICATION

This application is a divisional of U.S. Utility patent application Ser. No. 15/178,618, filed on Jun. 10, 2016. The entire disclosure of the above application is incorporated herein by reference.

BACKGROUND AND SUMMARY

The present disclosure relates generally to a press machine and more particularly to a safety power assist for a manual press.

Metal working presses are well known in the industry. Traditional fluid or electric motor actuated presses employ complicated optical sensors or light curtains adjacent a punch to stop punch advancement if a machine operator's finger or hand obstructs the optical path. One such traditional optical safety system is disclosed in U.S. Pat. No. 6,114,690 entitled "Light-Controlled Safety Switch for a Punch Press" which issued to Oei et al. on Feb. 5, 2000, and is incorporated by reference herein. Such conventional optical safety systems are very expensive and are prone to false obstruction detections due to common workplace dirt and contamination.

Another conventional approach is disclosed in U.S. Pat. No. 7,114,436 entitled "Safety Interlock and Retraction Mechanism for Clinching, Crimping, and Punching Presses" which issued to Mueller on Oct. 3, 2006. This patent is incorporated by reference herein. This traditional device employs a foot-operated pneumatic valve to activate pneumatic cylinders of a safety interlock and retraction mechanism. Full force actuation of the press is prohibited unless a predetermined thickness range of desired work material is placed between a punch and die of the press. This conventional device, however, adds undesired complexity and expense for a solely automatically actuated device.

In accordance with the present invention, a safety power assist for a manual press is provided. In another aspect, a press includes a tool, a manual actuator, a switch and an automatically powered actuator. A further aspect of the present press employs a spring which must be compressed beyond a predetermined pinching force before a switch is activated, where switch activation causes an automatically powered actuator to advance a workpiece-contacting punch or tool. Another aspect of the present press includes a wall with multiple holes, and a pin which is removeably insertable into at least one of the holes to adjustably limit retracted movement of a tool to provide shorter cycle times between repeated tool advancements as compared to if the pin was not inserted. A method of operating a press is also provided.

The press of the present system is advantageous over traditional press safety devices. For example, the present press does not employ an optical or a light obstruction detector, but instead uses a mechanical pinching arrangement which allows the machine operator to manually stop and reverse movement of the tool prior to automatic advancing movement of the tool. This present construction is significantly less expensive than prior safety systems, considerably more durable and robust in a dirty manufacturing environment, and is not prone to false obstacle detection. Additional advantages and features of the present press can be ascertained from the following description and claims, as well as the appended drawings.

BRIEF DESCRIPTION OF THE DRAWINGS

FIG. 3 is a front elevational view showing the present press;

FIG. 5 is a longitudinally sectioned view showing upper and lower tools employed in the present press;

FIGS. 14A and B are partially fragmented views, taken along line 14-14 of FIG. 10, showing the switch valve actuator assembly of the present press in different operating conditions;

FIG. 15 is an exploded perspective view showing a gear cover and removable upstop pin employed in the present press;

FIG. 23 is a diagrammatic side view showing another alternate embodiment manual actuator and transmission of the present press; and FIG. 24 is a diagrammatic side view showing another alternate manual actuator and transmission of the present press.

DETAILED DESCRIPTION

Figure 1:
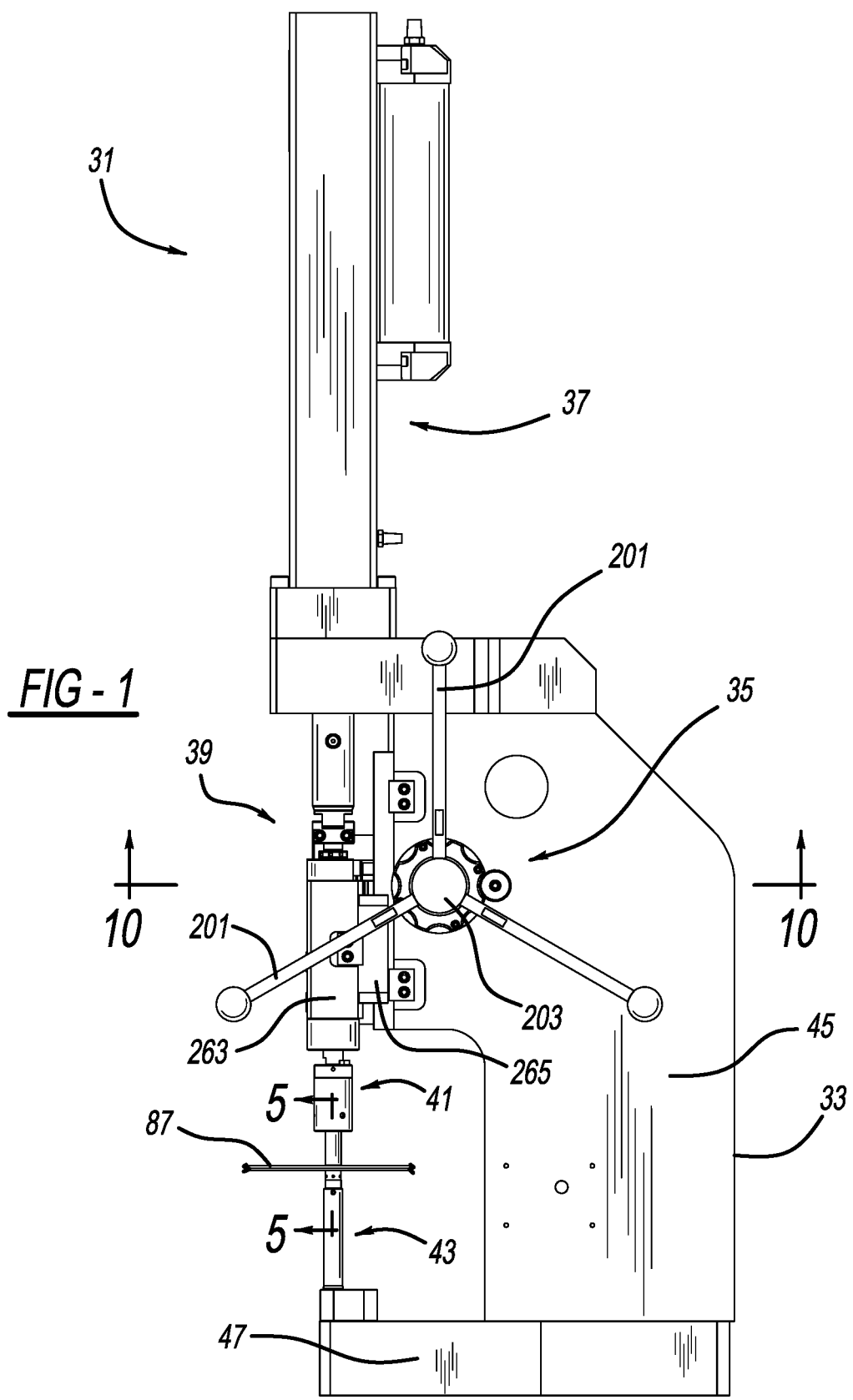
FIG. 1 is a side elevational view showing the present press.

Referring to FIGS. 1-3 and 4, a preferred embodiment of the present press machine 31 includes a frame 33, a manual actuator 35, an automatically powered actuator 37, a switch valve actuator assembly 39, an upper tool assembly 41 and a lower tool assembly 43. Frame 33 is a rigid and generally C-shaped member including a frame body 45 and a frame anvil or base 47 affixed thereto with threaded cap screw fasteners and dowel pins. Frame 33 is stationarily mounted directly or indirectly to a factory floor.

When used for clinching, upper tool 41 includes a longitudinally elongated punch 71, a punch holder 73, a circular-cylindrical outer housing 75, a compression spring 77 and a stripper 79. Stripper 79 has a laterally projecting disk-like section 81 and a circular-cylindrical can section 83 with a central aperture therein. A workpiece-contacting surface 85 of stripper 79 operably pushes against an upper surface of sheet-metal workpieces 87 or a press-operator's body part (as will be discussed hereafter) since spring 77 downwardly biases section 81 of stripper 79 away from holder 73. A workpiece-contacting distal end of punch 71 extends through the aperture in stripper 79 when the upper tool is advanced to a position further compressing spring 77. Holder 73 is further mounted to a holder extension 89 by threaded screw fasteners.

The preferred lower tool 43 includes a die body 91, an outer circular-cylindrical shield 93, multiple moveable die blades 95, and an O-ring or canted coiled spring retainer 97 moveably securing the die blades within the shield and biasing them toward a central anvil 99 of die body 91. A central tail of die body 91 is fastened within an upstanding die holder 101 which is, in turn, fastened within a supplemental die holder 103 mounted to frame anvil 47 by threaded fasteners or the like. The preferred upper and lower tools 41 and 43 are optimally used for forming a clinch joint between multiple sheet metal workpieces 87. These upper and lower tools are disclosed within U.S. Pat. No. 7,694,399 entitled "Sheet Fastening Apparatus and Method" which issued to Sawdon et al. on Apr. 13, 2010, and is incorporated by reference herein.

Figure 2:
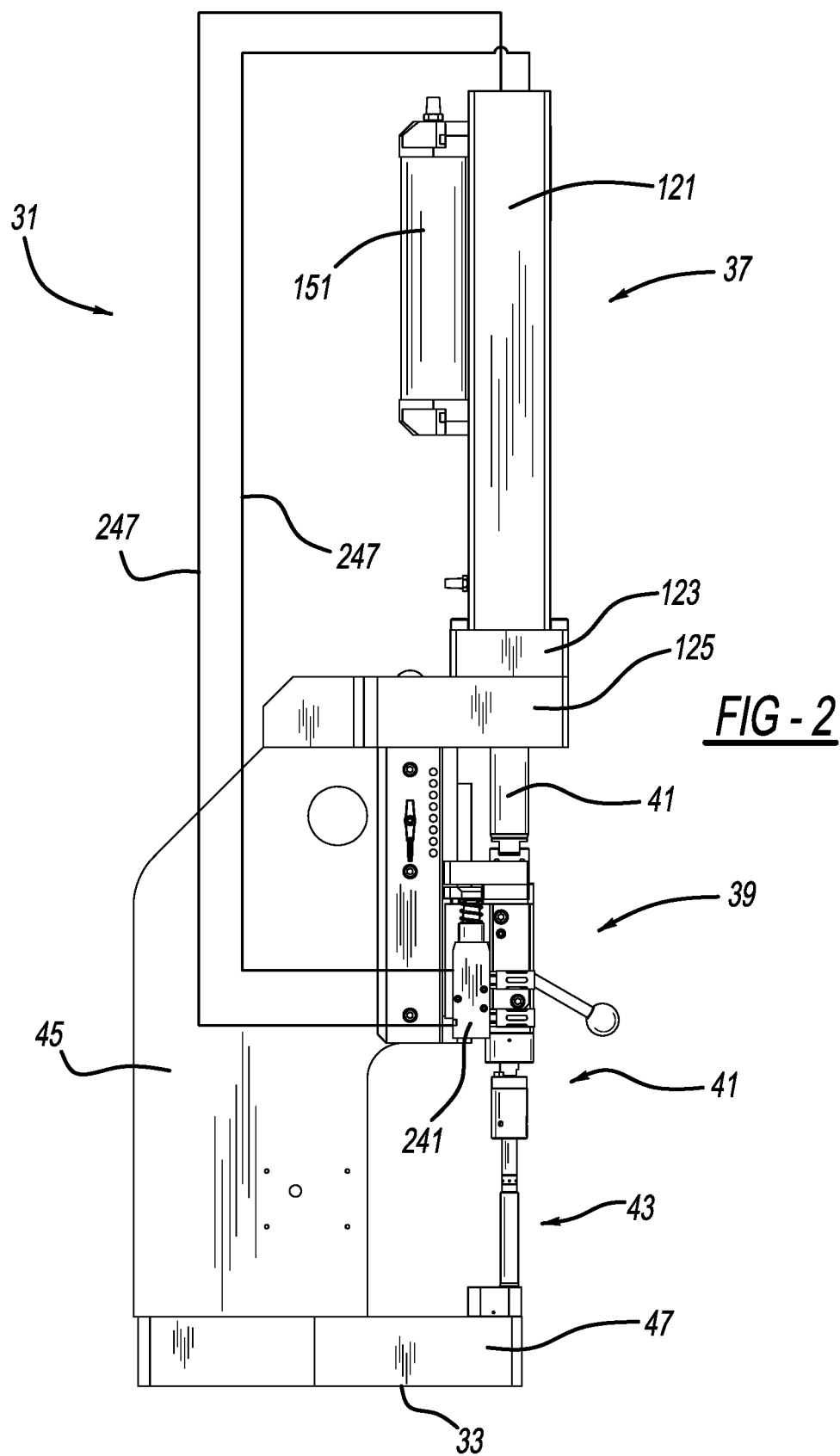
FIG. 2 is a side elevational view, taken opposite that of FIG. 1, showing the present press.
Figure 4:
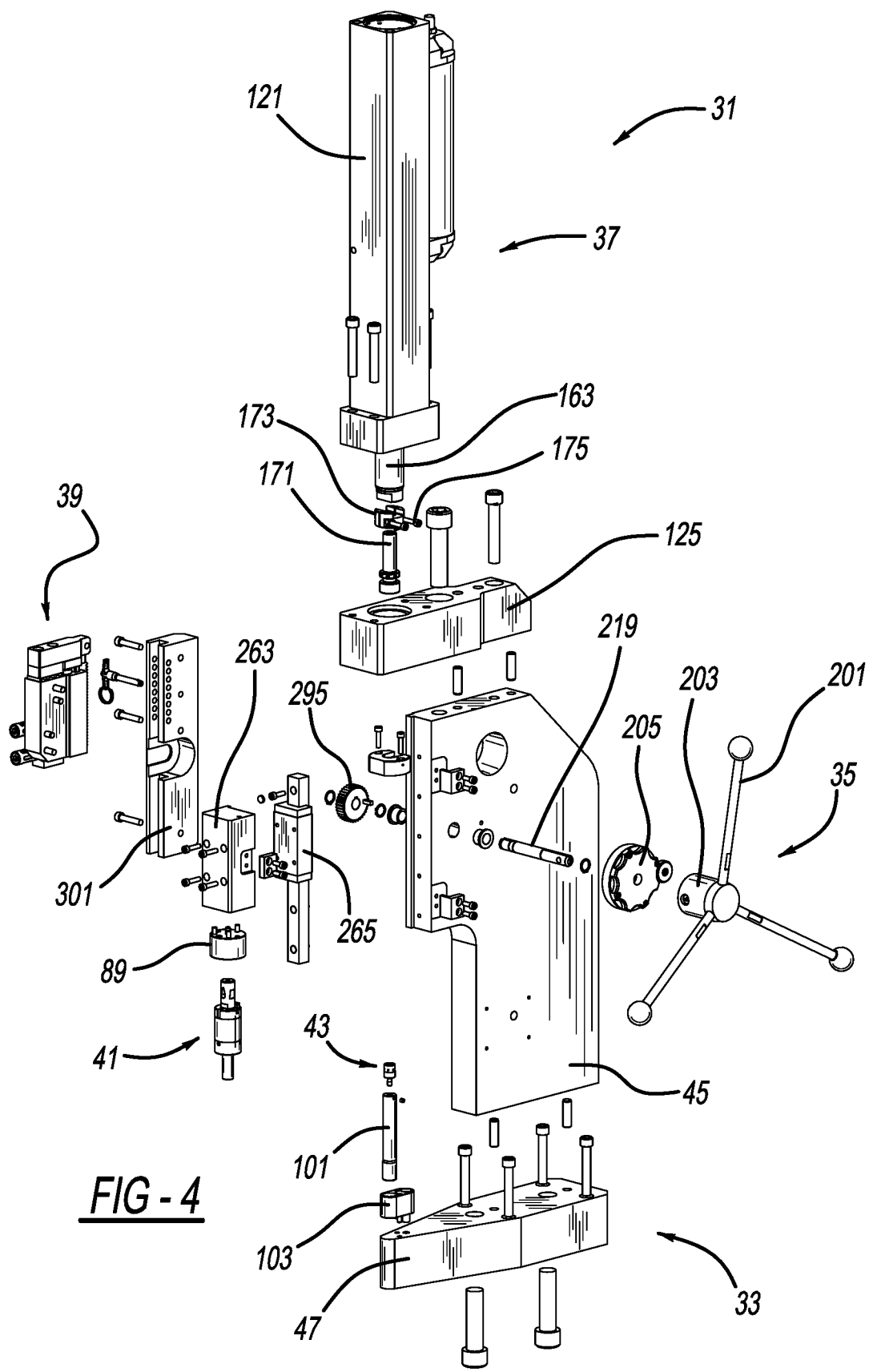
FIG. 4 is an exploded perspective view showing the present press.
Figure 6:
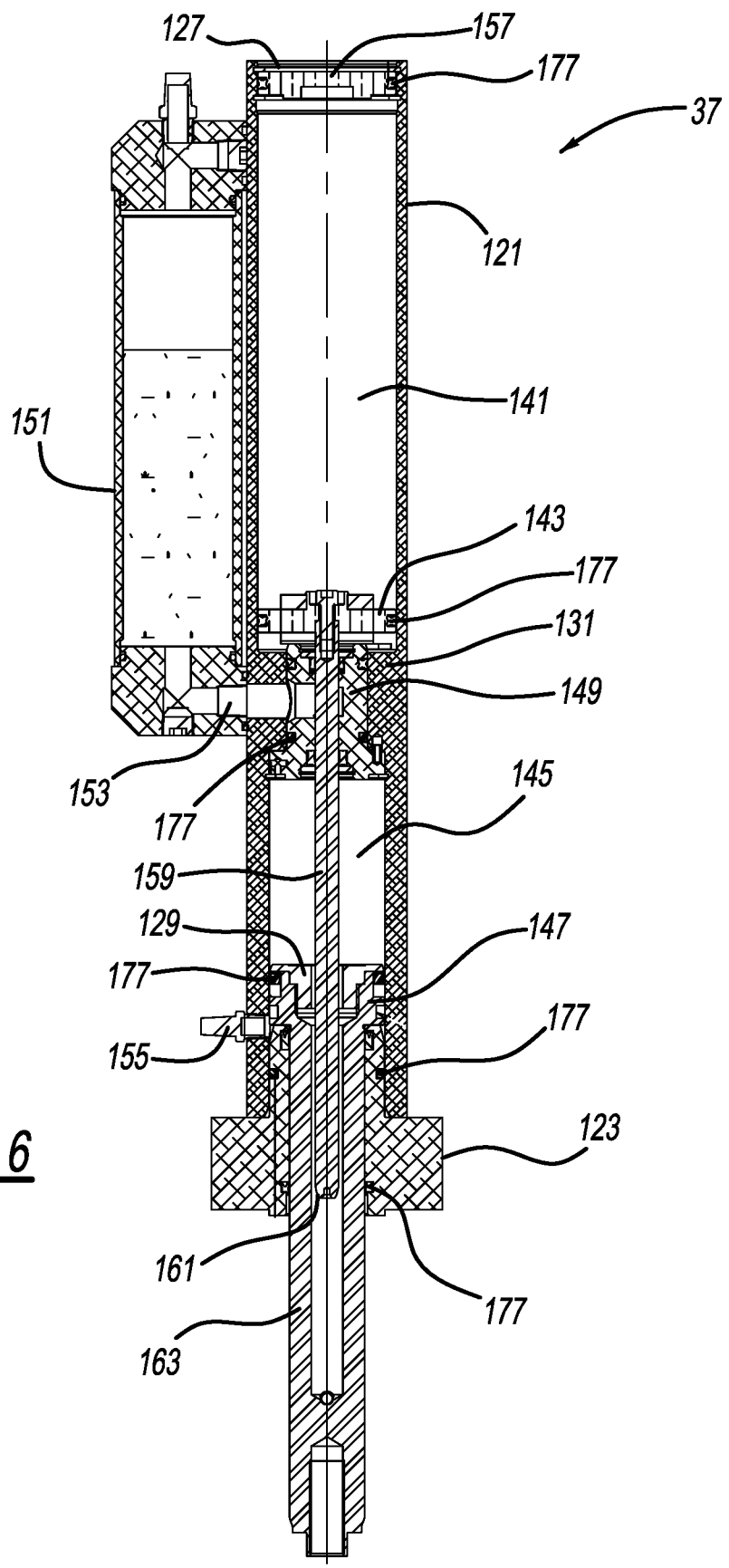
FIG. 6 is a longitudinally sectioned view showing an automatically powered actuator employed in the present press.
Figure 7:
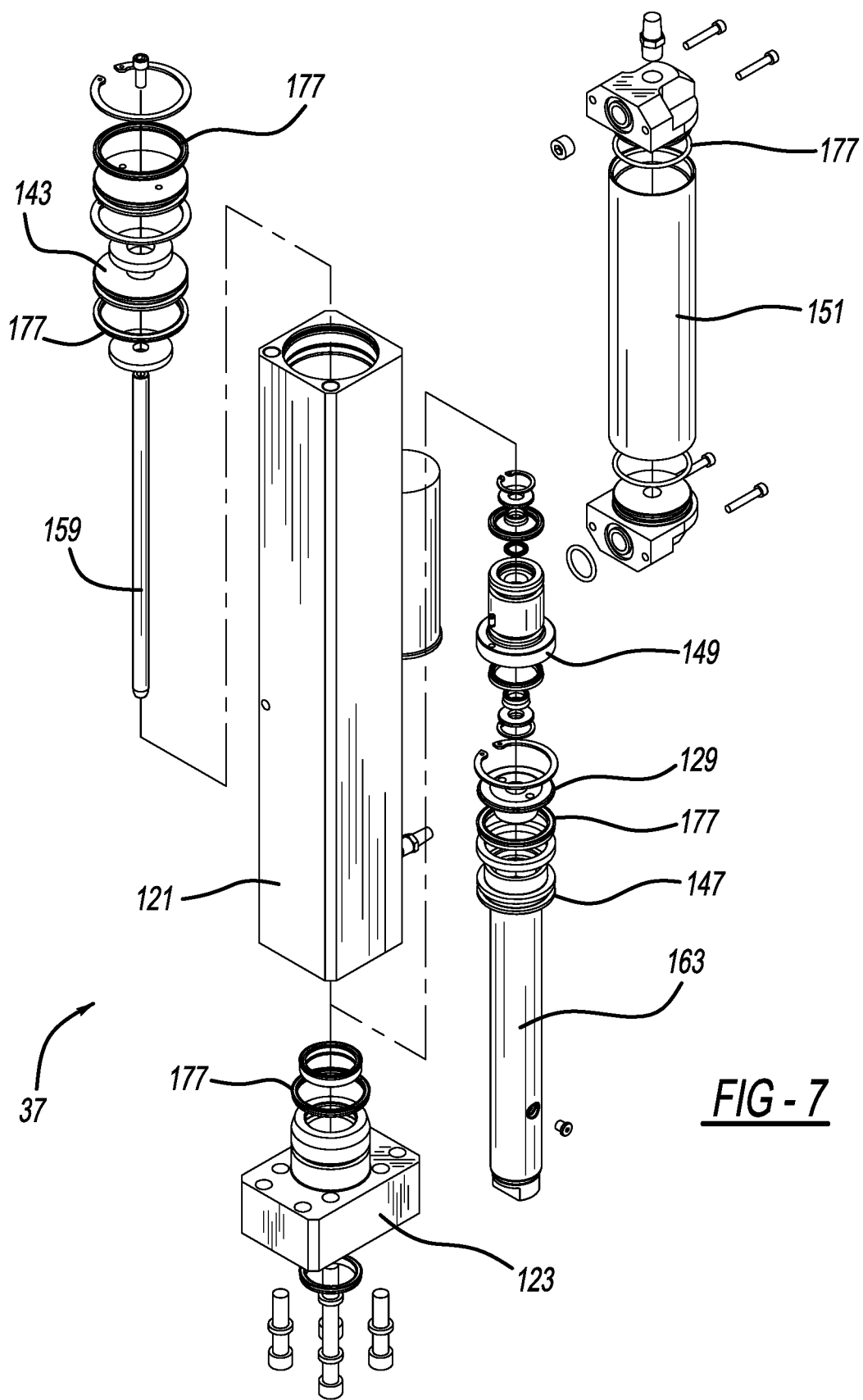
FIG. 7 is an exploded perspective view showing the automatically powered actuator of the present press.
Figure 8:
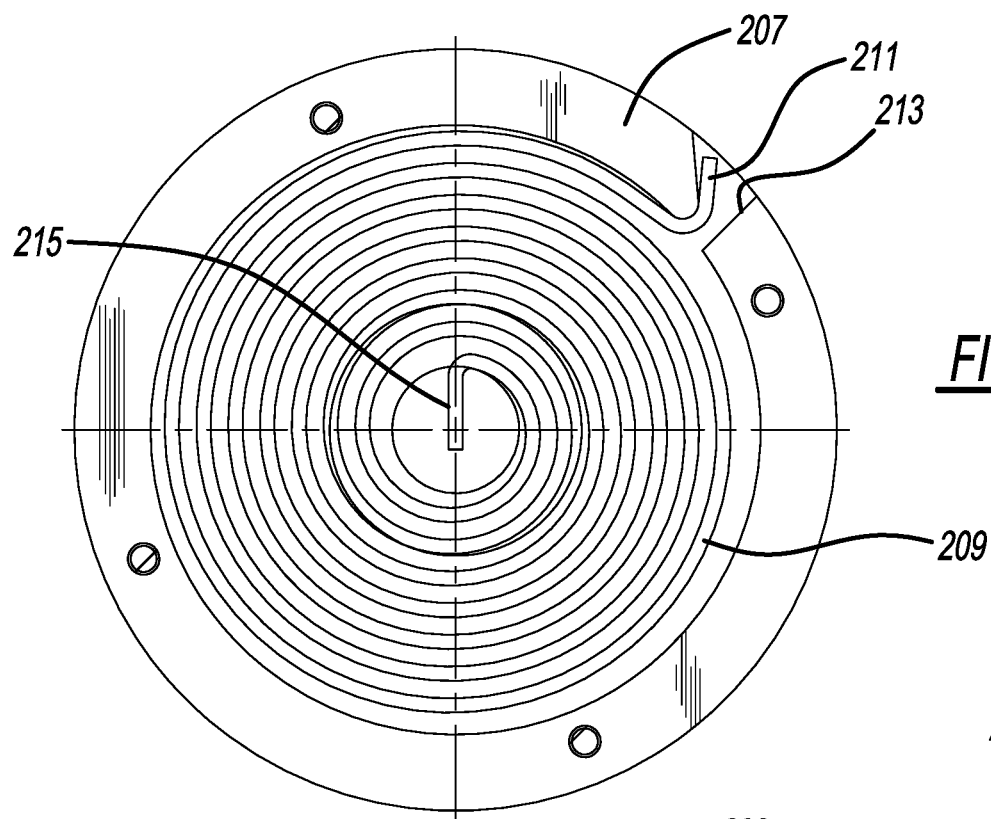
FIG. 8 is a side elevational view showing a clock spring assembly employed with a manual handle of the present press.
Figure 9:
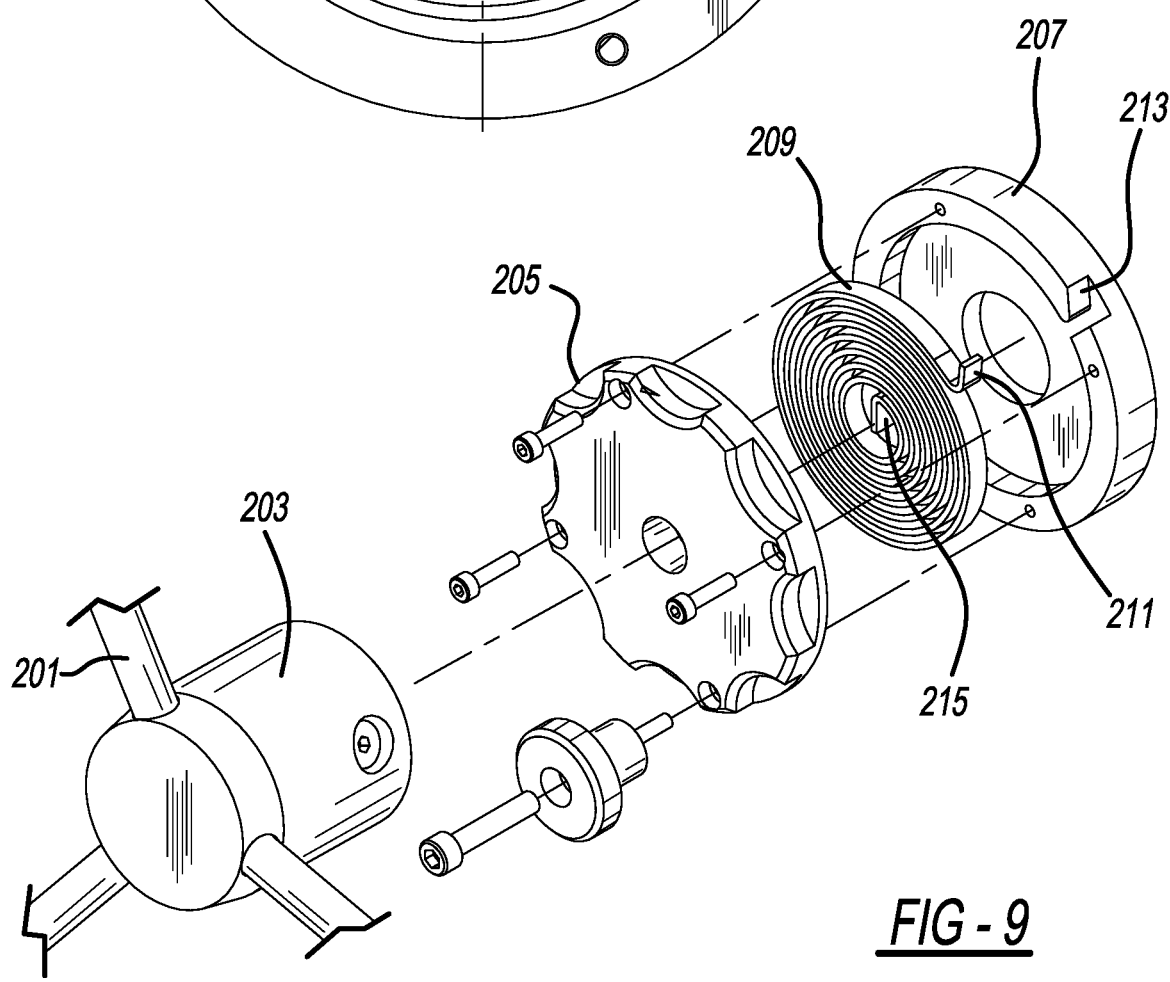
FIG. 9 is an exploded perspective view showing the manual handle, a hub and the clock spring assembly employed in the present press.
Figure 10:
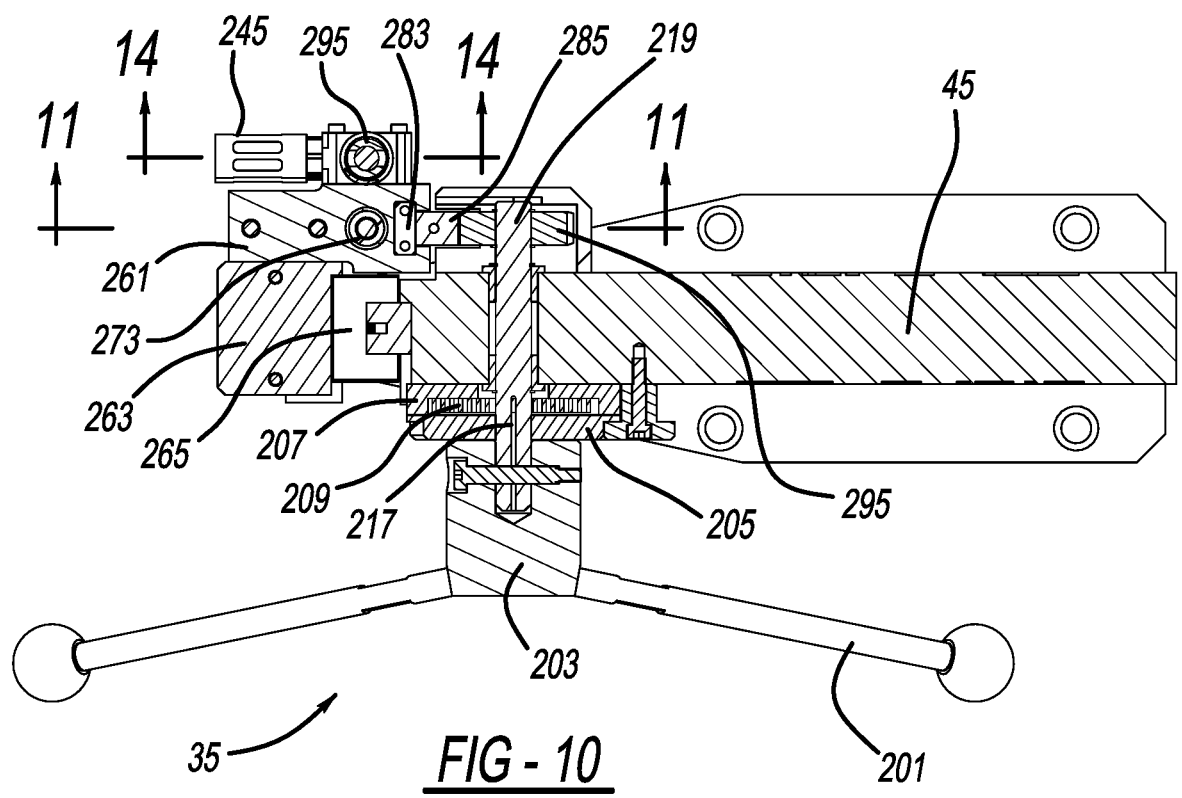
FIG. 10 is a cross-sectional view, taken along line 10-10 of FIG. 1, showing the present press.
Figure 11:
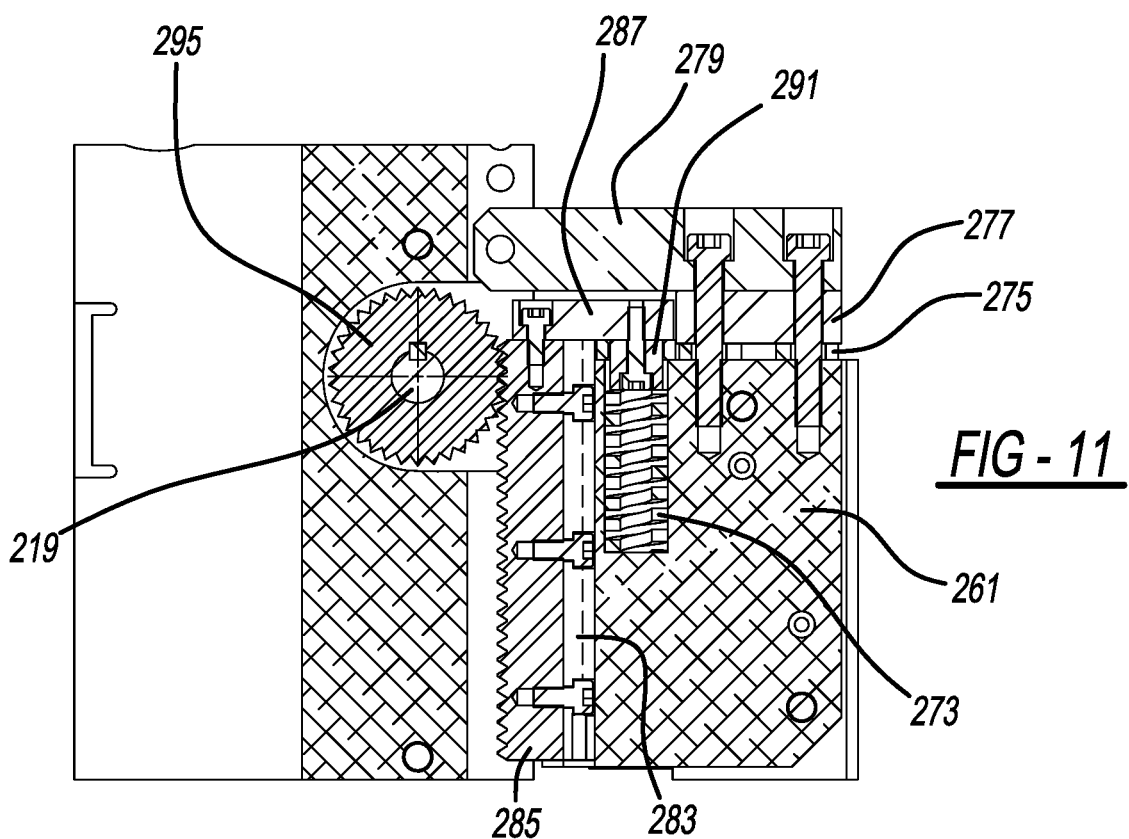
FIG. 11 is a longitudinally sectioned view, taken along line 11-11 of FIG. 10, showing a portion of the press.
Figure 12:
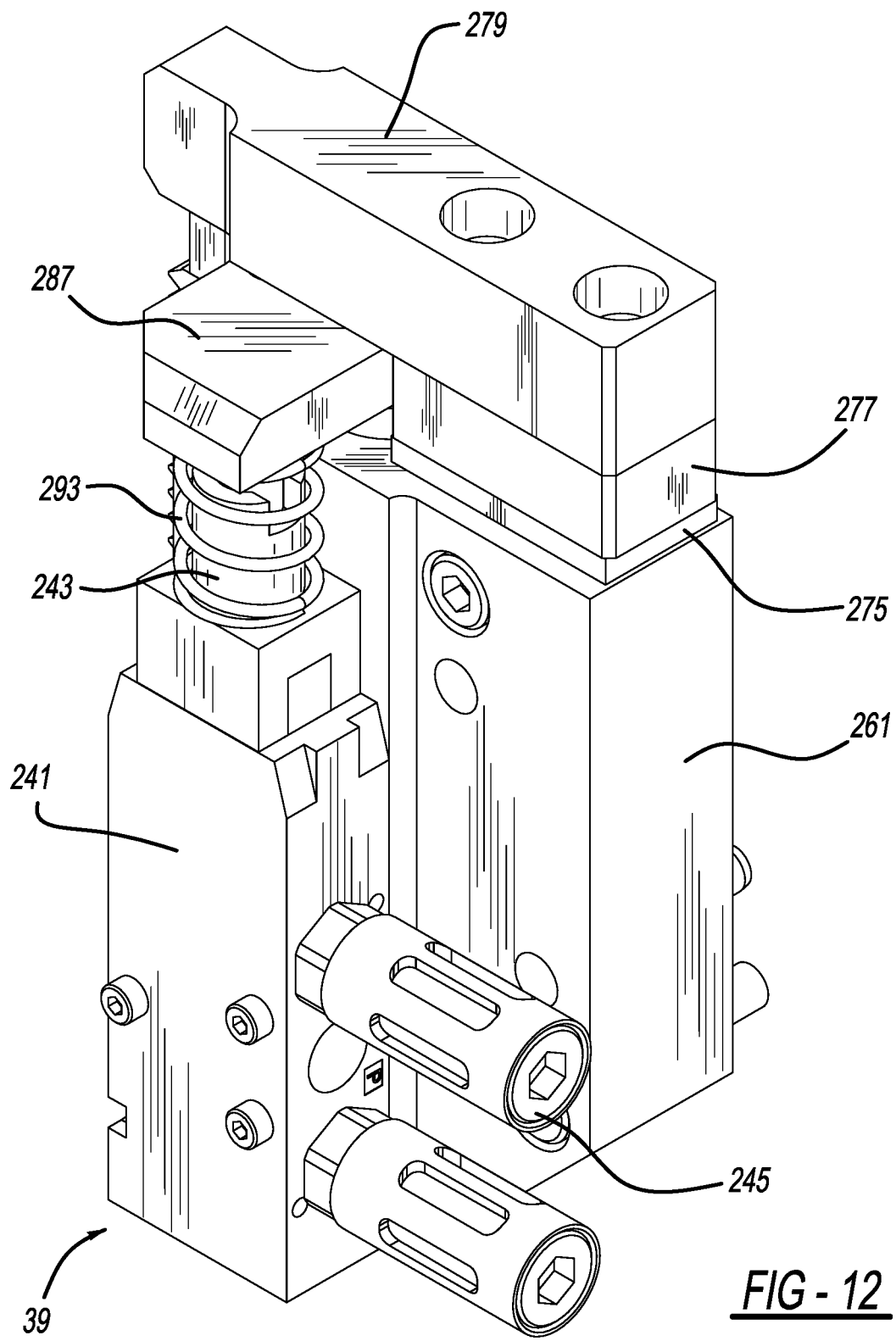
FIG. 12 is a perspective view showing a switch valve actuator assembly of the present press.
Figure 13:
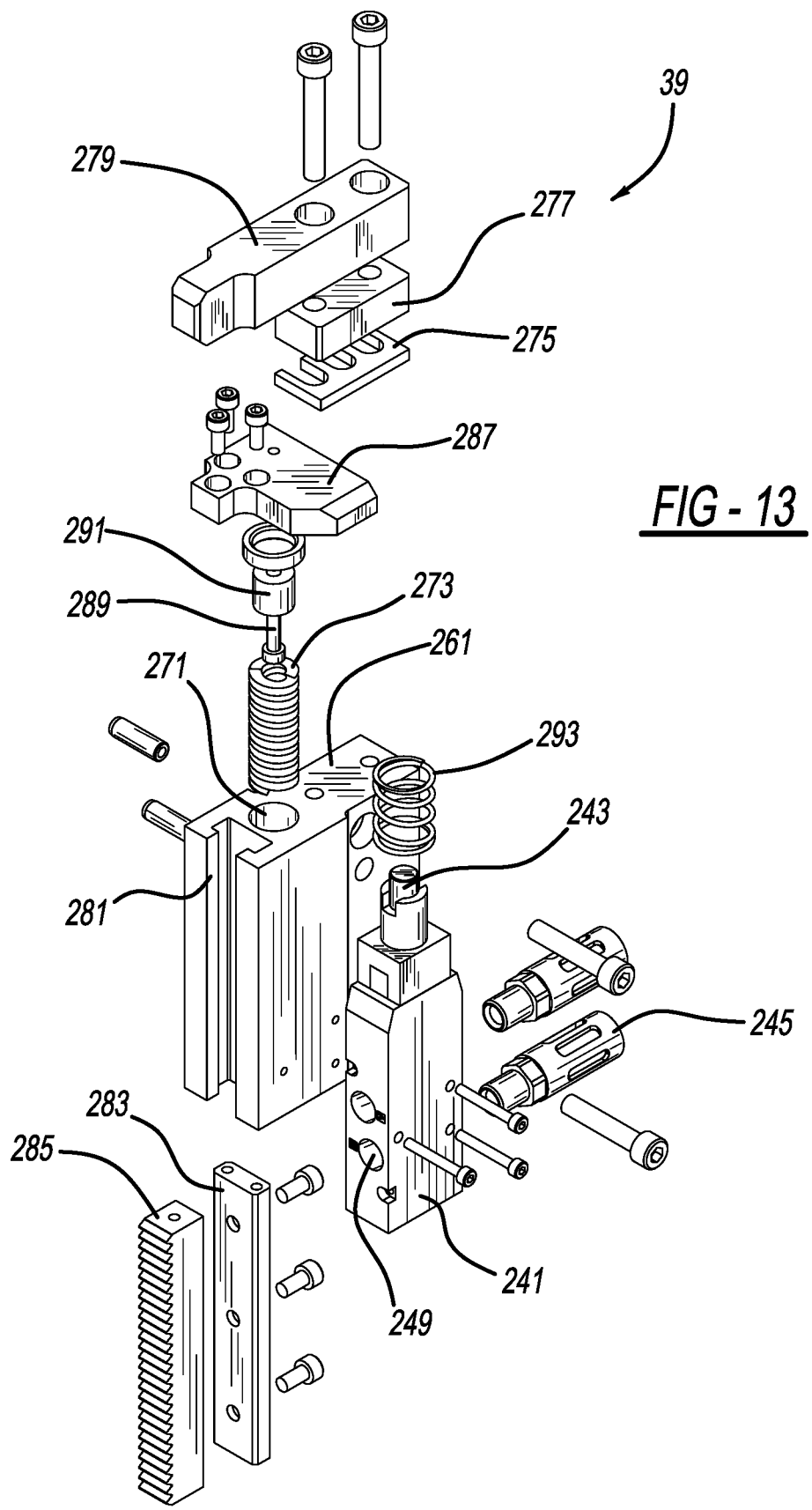
FIG. 13 is an exploded perspective view showing the switch valve actuator assembly of the present press.
Figure 16:
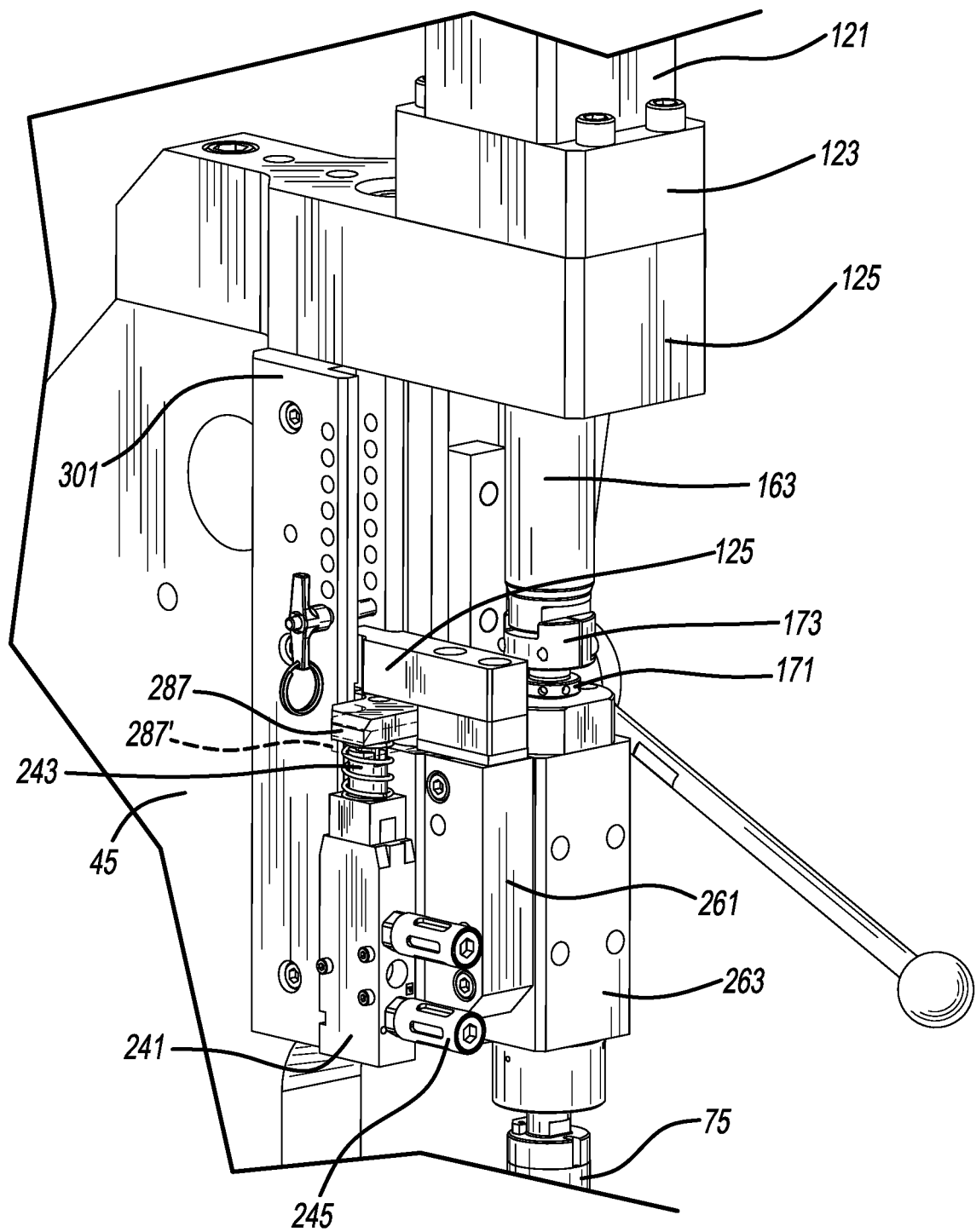
FIG. 16 is a perspective view showing a central section of the present press.

Reference will now be made to FIGS. 2, 6 and 7. Automatic actuator 37 is an air-to-oil intensifying cylinder of the general type disclosed in U.S. Pat. No. 7,263,831 entitled "Air-To-Oil Intensifying Cylinder" which issued to Sawdon et al. on Sep. 4, 2007, and U.S. Pat. No. 6,779,343 entitled "Air To Oil Intensifier" which issued to Sawdon on Aug. 24, 2004, both of which are incorporated by reference herein. The air-to-oil intensifier of automatic actuator 37 includes a longitudinally elongated and hollow housing 121. A front end cap 123 is firmly affixed to a lower end of housing 121 and includes a laterally extending flange which is mounted to a laterally elongated support 125, which in turn, is fastened to a top surface of frame body 45. A rear end cap 127 is firmly attached to an opposite top end of housing 121, and a central and integrally machined bulkhead divider 131 is disposed internal to housing 121.

An air cylinder cavity 141 is defined between end cap 127 and bulkhead divider 131 within which a first piston 143 linearly moves. An oil cylinder cavity 145 is located between bulkhead divider 131 and lower end cap 123 within which a second piston 147 linearly moves. Furthermore, an intermediate cap 129 is threadably engaged within and moves with piston 147. An oil valve assembly 149 is located within bulkhead divider 131 and is controlled to fluidically allow passage of the hydraulic oil between a storage tank 151, externally mounted to housing 121, and oil cylinder cavity 145 through a first oil port 153. Another oil port 155 is in communication with cavity 145 between an opposite face of second piston 147 and cap 123. Air ports 157 communicate with air cavity 141 on opposite faces of piston 143.

A longitudinally elongated piston rod 159 is centrally attached to and extends from first piston 143 such that a distal end 161 of piston rod 159 projects through intermediate cap 129 and into a hollow center of a piston rod 163 integrally longitudinally extending from second piston 147. Piston 163 serves as a linearly advancing and retracting ram which is coupled to upper tool assembly 41 via an adjustment coupler 171 and a coupling ring 173 by way of a pair of laterally extending threaded fasteners 175. Multiple seals 177 are located within housing 121 for the pistons and caps.

Manual actuator 35 can be observed in FIGS. 1, 4 and 8-11. Manual actuator 35 includes multiple elongated handles 201 secured to a central hub 203. Handles 201 are rotatable more than 360°. A pair of generally circular covers 205 and 207 sandwich a wound clock spring 209 therebetween which provides a counterbalancing force. An upturned outer end 211 of clock spring 209 is located within a slot 213 of cover 207 while an upturned inner end 215 of clock spring 209 is secured within an internal slot 217 of a laterally extending shaft 219. Covers 205 and 207 are stationarily fastened to frame body 45 while shaft 219 rotates with handle 201 and hub 203. Clock spring 209 is configured to bias handle 201 and a transmission mechanism attached thereto toward a retracted position to at least partially offset the effects of gravity and to require less retraction force should an undesired obstacle be encountered. Moreover, a spur or pinion gear 295 is connected to and rotates with shaft 219.

Referring now to FIGS. 10-14, 16, 20 and 21, valve actuator assembly 39 includes a pneumatically valved switch 241 having a linearly depressible plunger or button 243 on an upper end thereof. Silencers 245 are coupled to a body of switch 241. Furthermore, pneumatic lines 247 couple ports 249 of switch 241 with ports of automatically powered actuator 37 for controlling activation thereof.

A carriage 261 is securely fastened to a slide block 263, which in turn, is securely fastened to a car 265. The body of switch 241 is also fastened to a lateral side of carriage 261 for movement therewith. A longitudinally bored pocket 271 is located in an upper portion of carriage 261 for receiving a compression spring 273 therein. A shim 275, spacer 277 and laterally elongated head 279 are securely fastened on top of carriage 261 such that an open space is located between a lower surface of head 279 and a corresponding upper surface of carriage 261 above pocket 271.

Carriage 261 further includes a generally C-shaped undercut channel 281 extending in a longitudinal direction. A longitudinally elongated carrier 283 is received within channel 283 of carriage 261 such that carrier 283 is linearly and longitudinally moveable relative to carriage 261 in a lost-motion manner in at least some operating conditions. A gear toothed and longitudinally elongated rack 285 is securely fastened to carrier 283 for movement therewith. Rack 285 and pinion gear 295 act as the manual transmission mechanism. Moreover, an abutment plate or arm 287 is securely fastened to upper surfaces of rack 285 and carrier 283 for movement therewith. A central pin 289 and collar 291 are mounted to an underside surface of abutment plate 287 such that pin 289 extends within spring 273. The undersurface of plate 279 and/or bottom surface of collar 291 are interchangeably referred to herein as a spring abutment surface. Accordingly, the abutment surface operably contacts against and compresses spring 273 as well as another compression spring 275 wound around switch plunger 243. These springs are intended to be redundant with each other and are oriented in a parallel and offset manner.

A gear cover 301 is attached to frame body 45. Gear cover 301 includes at least one, and preferably a pair of longitudinally elongated and bifurcated walls 303, spaced apart by a groove within which rides an end of head 279. A set of longitudinally aligned holes 305 is located in each wall 303. A laterally elongated and cylindrical pin 307 has a T-shaped handle on an end thereof. An end of pin 307 may optionally contain an outwardly biased detent ball or hole for removeably receiving a cotter pin to prevent undesired machine vibrations from causing the pin to fall out of the gear cover. Pin 307 serves as a stop surface to prevent a narrowed width distal end of head 125 from linearly retracting past the pin location when the head, tool and associated mechanisms are manually retracted. This upstop construction is ideally suited when fast cycle times are desired for repeated operations on the same workpiece. Furthermore, a storage hole 309 is provided in gear cover 301 such that pin 307 can be inserted therein if the full retraction movement or stroke is desired.

Figure 17:
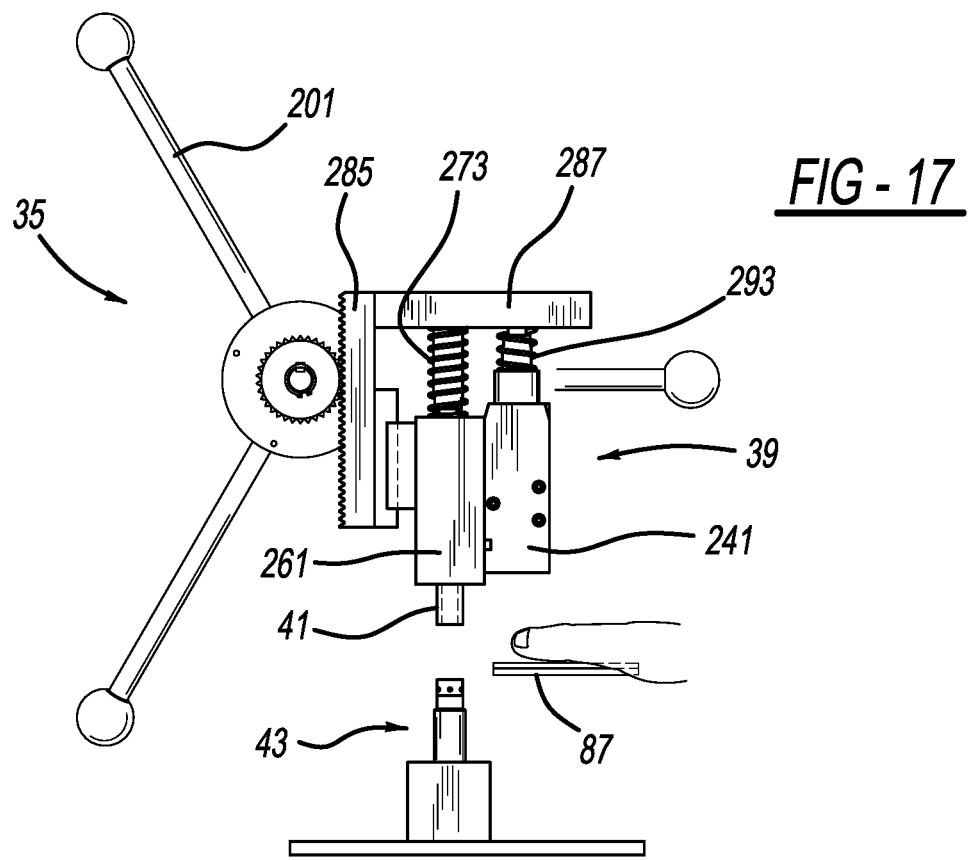
FIG. 17 is a diagrammatic side view showing the present press in a retracted position.
Figure 19:
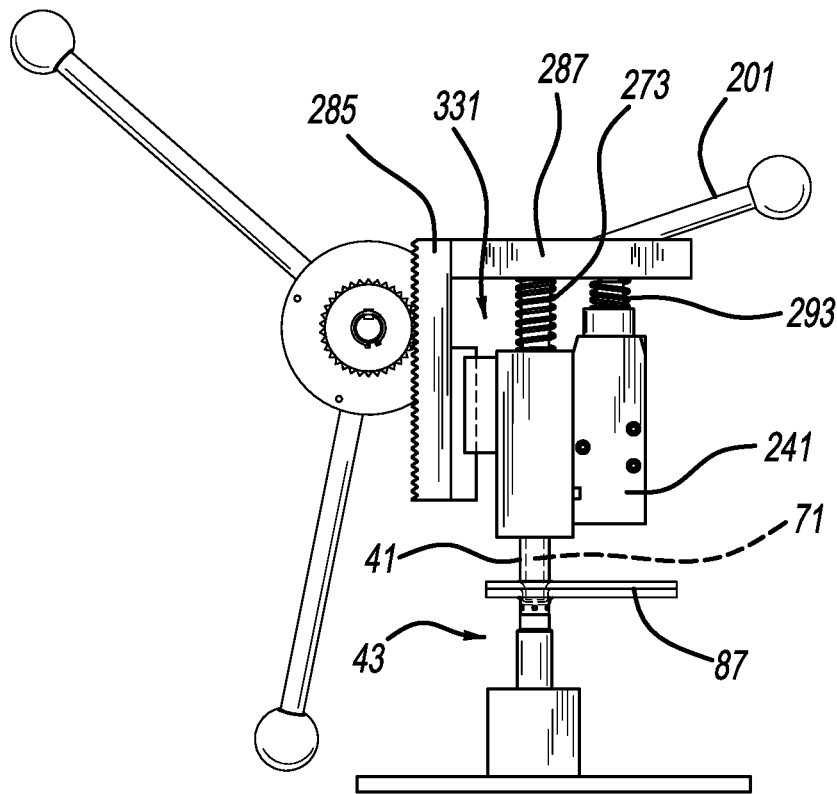
FIG. 19 is a diagrammatic side view showing the present press in a fully advanced and workpiece engaging position.
Figure 20:
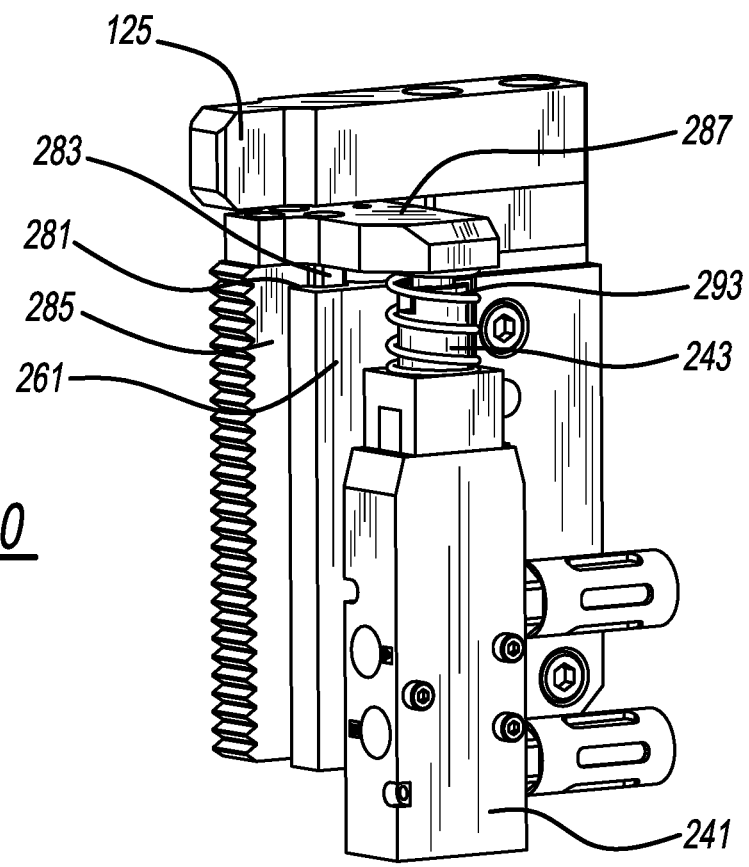
FIG. 20 is a perspective view showing the switch valve actuator assembly of the present press in a switch activating position.
Figure 21:
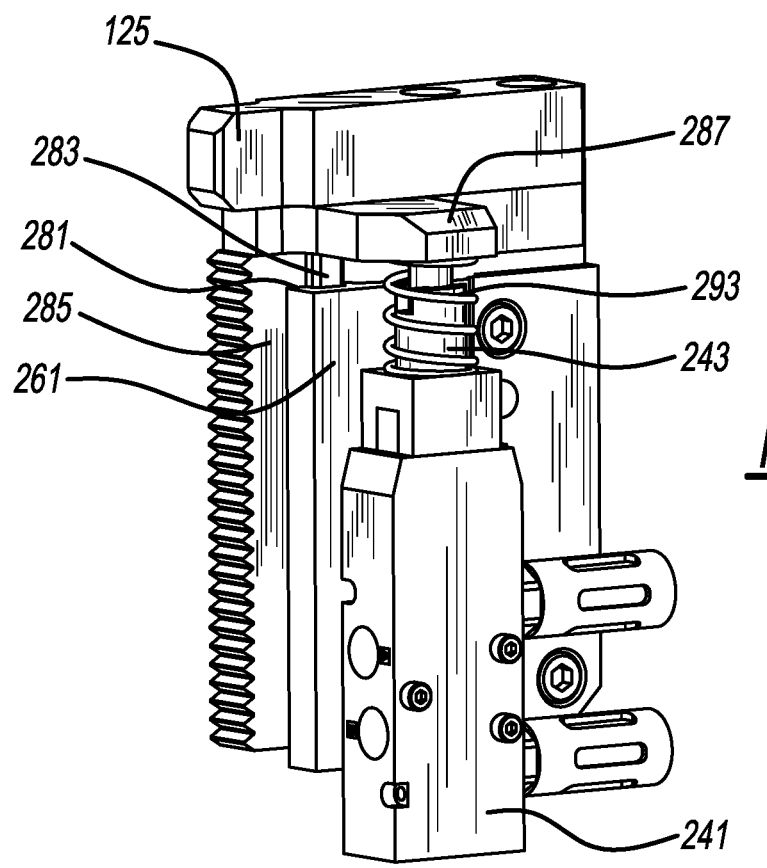
FIG. 21 is a perspective view showing the switch valve actuator assembly of the present press in a retracted or pinching position.

Operation of the present press can best be observed by comparing FIGS. 17-21 and also with reference to FIGS. 10, 11, 13 and 16. FIG. 17 illustrates handle 201 of manual actuator 35 rotated such that valve actuator assembly 39 and upper tool 41 are in a retracted position spaced away from lower tool 43. In this operating condition, abutment plate 287 is fully spaced away from switch 241 to the fullest extent allowed in the space bordered by head 279 such that springs 273 and 293 are essentially not compressed or minimally compressed in this condition as shown in FIG. 21.

Figure 18:
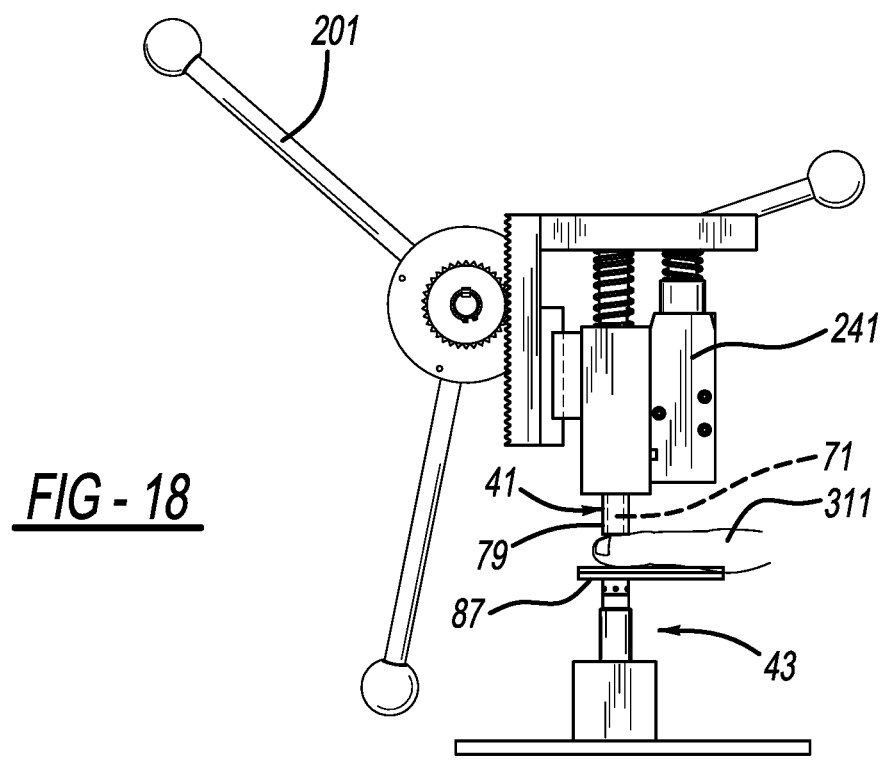
FIG. 18 is a diagrammatic side view showing the present press in a finger-pinching intermediate position.

FIG. 18 illustrates the situation where the human machine operator's body part, such as a hand or finger 311, is inadvertently located between or obstructs punch 71 of upper tool assembly 41 and the workpiece. The operator has rotated handle 201 to simultaneously downwardly advance upper tool 41 and switch 241 toward lower tool 43. In this operating condition, upper tool 41, more specifically a lower surface of stripper 79, pinches finger 311 between it and workpieces 87. This undesired tool-to-finger contact during manual tool advancement incurs an uncomfortable but not harmful pinching force preferably of at least fifty pounds per square inch and less than or equal to one hundred pounds per square inch. In this pinching scenario, abutment plate 287 has not yet compressed springs 273 and 293 enough to depress plunger 243 such that switch 241 has not yet activated the automatically powered actuator cylinders. If a pinched condition is felt by the operator, the operator can then manually reverse rotation of handle 201 so as to remove the obstruction prior to automatically powered punch advancement.

FIGS. 19 and 20 illustrate the desired metal-working operating condition, without the presence of the body part or other obstruction. In this situation, a lost motion coupling 331 allows limited independent movement caused by relative movement of rack 285 and carrier 283 relative to channel 281 of carriage 261. This allows further advancing rotation of handle 201 to linearly advance rack 285 which causes the abutment surface of abutment plate 287 to fully compress springs 273 and 293. Thereby, plunger 243 causes switch 241 to activate and energize the powered actuator which, in turn, automatically advances punch 71 to deform workpieces 87 against the aligned die of lower tool assembly 43.

In other words, the upper tool is manually advanced to contact against the workpieces by the pinion gear linearly driving the rack. The switch is moved with the rack the full distance in the normal nonobstructed situation. Then, further manual turning of the handle will move the rack and abutment plate a small distance until the switch is activated to automatically drive the punch into the workpiece in a "power assist" manner. After the clinch joint is created, automatically powered actuator retracts punch and the operator manually retracts the tool and switch assemblies.

Figure 22:
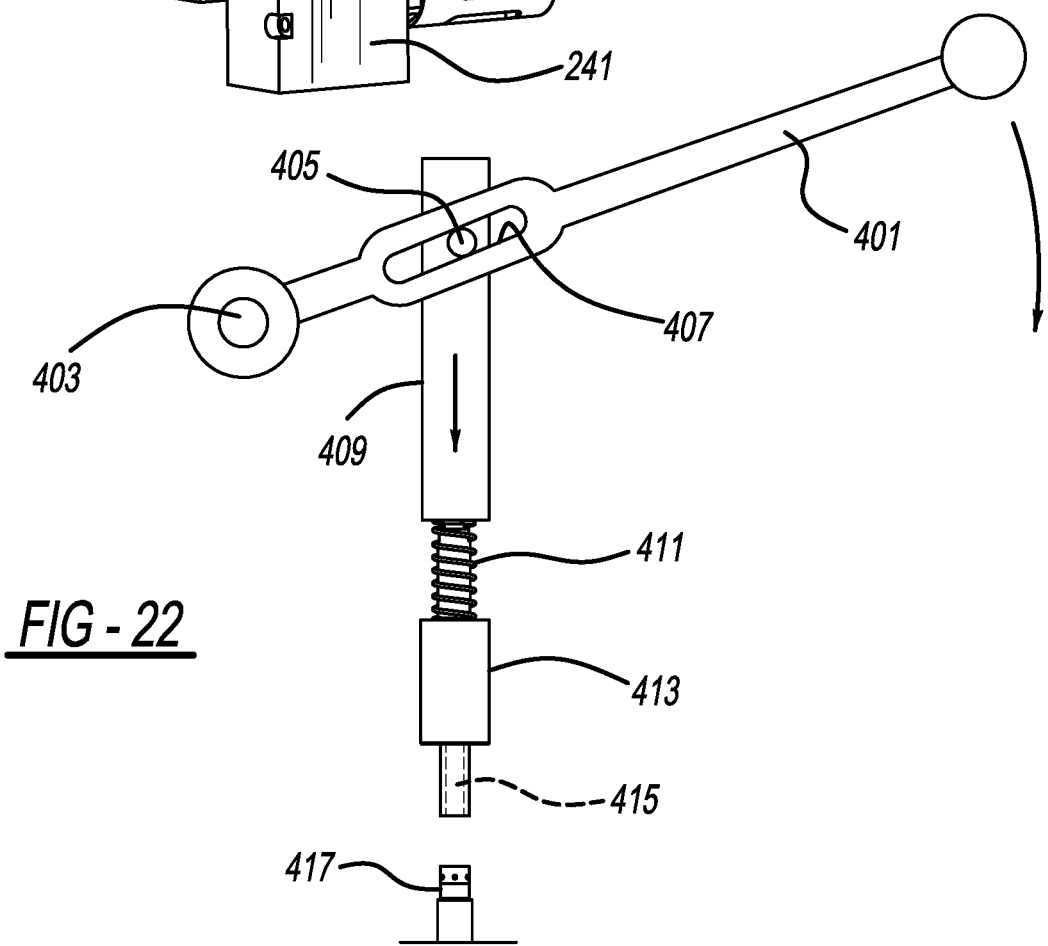
FIG. 22 is a diagrammatic side view showing an alternate embodiment manual actuator and transmission of the present press.

FIG. 22 shows an alternate embodiment of a manual actuator and transmission mechanism. A lever-arm type of handle 401 is pivotable about a pivot axis 403 less than 360°. A lost motion pin 405 and camming slot 407 are coupled to handle 401 to provide linear motion to a longitudinally elongated ram 409. An end of ram 409 is coupled to an upper tool 413 including a punch 415. Spring 411 allows for a predetermined pinching force to be applied between upper tool assembly 413 and a lower tool assembly 417 against an obstruction therebetween before full compression of spring 411 activates a switch connected to an automatically powered actuator as discussed with the prior embodiment.

Another embodiment of a manual actuator and mechanical transmission is shown in FIG. 23. A rotatable handle, such as a wheel 451 has a jack screw 453 centrally connected thereto which advances and retracts a linearly moving ram 455 coupled thereto. A biasing spring 457, and an upper tool assembly 459, including a punch 461, are also provided. This arrangement allows for pinching force and spring compression due to an obstruction prior to switch activation of an automatically powered actuator to further advance punch 461 as previously described.

FIG. 24 illustrates a lever arm type of manually moveable handle 481 coupled to a toggle mechanism 483. Toggle mechanism 483 includes multiple pivotably attached links 485 and 487, at least one of which may optionally include a lost motion camming slot 489 and cam follower pin 491. A pivot of toggle mechanism 483 is coupled to a linearly moveable ram 493. A compression spring 495 allows a pinching force against an obstruction by punch 497 of an upper tool assembly 499 prior to switch activation of an automatically powered actuator as previously discussed hereinabove.

It is alternately envisioned that the upper tooling for any of the prior embodiments may consist of any type of punch or structure which deforms or acts upon workpieces. Similarly, the disclosed lower tooling may also be replaced by any die or tooling arrangement which assists in deforming or acting upon the workpieces. For example, a stripper and spring may not be necessary when the punch is solely used to pierce a hole in one or more workpieces. Furthermore, the punch and die tooling can be used to set a rivet, set a clinch nut or set a clinch stud fastener. Alternately, the punch and die arrangement may be used to form a bend in one or more workpiece surfaces. Notwithstanding, the present press is ideally suited for use in creating an interlocking clinch joint between two or more sheet metal workpieces.

While various embodiments have been disclosed herein, it should be appreciated that other variations may be employed. For example, an electromagnetic actuator such as a stepper motor, a pneumatic only cylinder, or a hydraulic only cylinder can be employed instead of the preferred automatically powered actuator, although some of the advantages of the present press may not be achieved. Alternate or additional gearing, camming or linkage arrangements may be provided in the present mechanical transmission, however, certain cost and durability features may not be realized. The pinching force compression springs may be replaced by other type of biasing members or moved to alternate locations, although the packaging and durability benefits of the present press may not be realized. An electrical rather than pneumatic switch can be used, but it will not be as advantageous. It should be appreciated that one or more of the features of each of the embodiments and each of the independent and dependent claims may be interchanged and/or combined with each other. It should also be recognized that various changes and modifications may be made without departing from the spirit and scope of the present invention.

The invention claimed is:

1. A method of operating a press, the method comprising:
    (a) rotating a manually operable handle;
    (b) linearly advancing a tool due to rotation of the handle;
    (c) compressing a human body part with an uncomfortable but not harmful pinching force of 50-100 pounds per square inch, prior to ram activation, when the body part obstructs advancement of the tool;
    (d) allowing manual reversal of the handle and the tool before the ram activation, to allow removal of the obstructing body part;
    (e) compressing a spring enough to cause switch activation when the pinching force is exceeded;
    (f) energizing an automatically powered actuator by the switch when the switch is activated; and
    (g) advancing the ram in response to step (f).

2. The method of claim 1, wherein the tool includes a punch, further comprising deforming a sheet metal workpiece with the punch.

3. The method of claim 1, further comprising contacting an abutment surface against the switch if the spring is compressed by more than the pinching force, and the tool including a workpiece-clinching punch moveable toward a clinching die mounted to a stationary C-frame.

4. The method of claim 1, further comprising rotating a pinion gear with the handle and fluidically moving a piston in the automatically powered actuator if the switch is activated, the switch being a pneumatic switch.

5. The method of claim 1, wherein the automatically powered actuator comprises a fluid-driven piston coaxially aligned with the tool which includes a punch, further comprising linearly advancing the punch to fasten together workpieces within the press when the switch is activated.

6. The method of claim 1, further comprising clinching together workpieces in the press with an interlocking joint when the switch is activated and after the rotating of the handle.

7. The method of claim 1, further comprising riveting together workpieces in the press when the switch is activated and after the rotating of the handle.

8. The method of claim 1, further comprising:
    moving toggle links by manual rotation of the handle; and
    moving the switch in response to the movement of the toggle links.

9. The method of claim 1, further comprising compressing the spring and a plunger of the switch to energize the automatically powered actuator.

10. A method of operating a press, the method comprising:
    (a) rotating a manually operable handle;
    (b) linearly advancing a tool due to rotation of the handle;
    (c) compressing a part with a pinching force of 50-100 pounds per square inch, prior to ram activation, when the part obstructs advancement of the tool;
    (d) allowing manual reversal of the handle and the tool before the ram activation, to allow removal of the obstructing part;
    (e) compressing a spring enough to cause switch activation when the pinching force is exceeded;
    (f) energizing an automatically powered actuator by the switch when the switch is activated;
    (g) advancing the ram in response to step (f);
    (h) manually rotating the handle at least 360°;
    (i) rotating a pinion gear coupled to the handle;
    (j) linearly moving a geared rack due to the rotating of the pinion gear; and
    (k) the movement of the rack causing movement of the switch.

11. The method of claim 10, wherein the tool includes a punch, further comprising deforming a sheet metal workpiece with the punch.

12. The method of claim 10, further comprising contacting an abutment surface against the switch if the spring is compressed by more than the pinching force, and the tool including a workpiece-clinching punch moveable toward a clinching die mounted to a stationary C-frame.

13. The method of claim 10, wherein the automatically powered actuator comprises a fluid-driven piston coaxially aligned with the tool which includes a punch, further comprising linearly advancing the punch to fasten together workpieces within the press when the switch is activated.

14. The method of claim 10, further comprising clinching together workpieces in the press with an interlocking joint when the switch is activated and after the rotating of the handle.

15. A method of operating a press, the method comprising:
    (a) manually rotating a handle;
    (b) initially advancing a punch due to rotation of the handle;
    (c) compressing a spring and an adjacent switch plunger with greater than 100 pounds per square inch of force prior to activation of a fluid powered actuator;
    (d) allowing manual reversal of the handle and the punch before the fluid powered actuator activation, if the force is less than 100 pounds per square inch;
    (e) energizing the fluid powered actuator in response to step (c) and after step (b), which fully advances the punch; and
    (f) fastening workpieces together with the punch in response to step (e).

16. The method of claim 15, further comprising:
    contacting an abutment surface against the switch plunger if the spring is compressed by more than 100 pounds per square inch of the force; and
    moving the punch which is a workpiece-clinching punch toward a clinching die mounted to a stationary C-frame.

17. The method of claim 15, further comprising:
    rotating a pinion gear with the handle; and
    subsequently fluidically moving a piston of the fluid powered actuator if a pneumatic switch is activated by compression of the switch plunger.

18. The method of claim 15, wherein the fluid powered actuator comprises a fluid-driven piston coaxially aligned with the punch, further comprising linearly advancing the punch to clinch together the workpieces within the press as part of the fastening step.

19. The method of claim 15, further comprising clinching together workpieces in the press with an interlocking joint as part of the fastening step when the switch plunger is compressed and after the manually rotating of the handle.

20. The method of claim 15, further comprising riveting together workpieces in the press as part of the fastening step when the switch plunger is compressed and after the manually rotating of the handle.

21. The method of claim 15, further comprising:
manually rotating the handle at least 360°;
rotating a pinion gear coupled to the handle;
linearly moving a geared rack due to the rotating of the pinion gear; and
the movement of the rack causing movement of a switch including the switch plunger.

22. The method of claim 15, further comprising:
moving toggle links by the manually rotating of the handle; and
moving a switch including the switch plunger, in response to the movement of the toggle links.

23. A method of operating a press, the method comprising:
(a) manually rotating a handle by at least 360°, a pivot of the handle being coupled to a stationary C-frame of the press;
(b) advancing a workpiece-clinching punch toward a workpiece-clinching die due to step (a);
(c) mechanically deterring the punch from advancing when an undesired pinching force occurs prior to the punch contacting a workpiece, and prior to automatic ram activation;
(d) allowing manual reversal of the handle and the punch before the automatic ram activation when step (c) occurs;
(e) compressing a spring and an adjacent switch plunger to cause switch activation when the punch contacts the workpiece;
(f) energizing an automatically powered actuator by the switch in response to step (e); and
(g) automatically advancing the punch in response to step (f) to create a clinch joint in the workpiece after the rotating of the handle is completed.

24. The method of claim 23, further comprising contacting an abutment surface against the switch if the spring is compressed by more than the undesired pinching force.

25. The method of claim 23, further comprising:
rotating a pinion gear with the handle; and
fluidically moving a piston of the automatically powered actuator when the switch is activated, the switch being a fluid switch.

26. The method of claim 23, further comprising:
rotating a pinion gear coupled to the handle;
linearly moving a geared rack due to the rotating of the pinion gear; and
the movement of the rack causing movement of the switch and the punch.

27. The method of claim 23, further comprising:
winding a clock spring due to the rotating of the handle; and
biasing the handle toward a retracted position by the clock spring.

28. The method of claim 23, wherein the automatically powered actuator comprises a fluid powered piston coaxially aligned vertically above the punch and the die.

29. The method of claim 23, further comprising linearly moving a carriage, to which the switch is fastened, and an end the spring being located in a pocket of the carriage.

* * * * *